(12) United States Patent
Fangeat et al.

(10) Patent No.: US 7,197,380 B2
(45) Date of Patent: Mar. 27, 2007

(54) SYSTEM FOR CONTROLLING THE STABILITY OF A VEHICLE USING AN ALGORITHM COMPARING AVERAGE SLOPES OF VARIATION OF A PARAMETER

(75) Inventors: Nicolas Fangeat, Chamalieres (FR); Georges Levy, Tokyo (JP)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 123 days.

(21) Appl. No.: 11/039,108

(22) Filed: Jan. 18, 2005

(65) Prior Publication Data
US 2005/0187672 A1     Aug. 25, 2005

(30) Foreign Application Priority Data
Jan. 16, 2004  (FR)  .................................. 04 00423
Jan. 16, 2004  (FR)  .................................. 04 00424

(51) Int. Cl.
G05D 1/00       (2006.01)
(52) U.S. Cl. ............... 701/1; 701/71; 701/72; 701/80; 701/90; 73/146; 340/442
(58) Field of Classification Search .................. 701/1, 701/71, 72, 74, 80, 82, 90; 73/146; 303/147; 340/439, 442
See application file for complete search history.

(56) References Cited

U.S. PATENT DOCUMENTS 3,980,346 A     9/1976 Leiber ........................... 303/6

(Continued)

FOREIGN PATENT DOCUMENTS

DE         40 30 724 A1    2/1992

(Continued)

OTHER PUBLICATIONS

Grosch, K. A., "Determination of Friction and Wear Resistance of Tread Compounds—Part I: Wet Skid," Kautschuk and Gummi Kunststoffe, Jun. 1996, v49, No. 6, p. 432-441 (Abstract).

(Continued)

*Primary Examiner*—Gertrude A. Jeanglaude
(74) *Attorney, Agent, or Firm*—Fitzpatrick, Cella, Harper & Scinto (57) ABSTRACT

System for controlling the stability of a vehicle, the system comprising means for imparting a longitudinal force on the tire and means for calculating the slip parameter $G^{Opt}$ at each activation of the means for imparting a longitudinal force on the tire in the following manner: determining coefficients $A_{[avg/p]}$ by direct calculation or by an appropriate regression, from a sufficient number of pairs ($\mu_i$, $G_i$), so as to model a first curve of variation $\mu_i = f(G_i, A_{[avg/p]})$ including the origin, and the pair or pairs ($\mu_i$, $G_i$), in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs ($\mu_i$, $G_i$), so as to model a second variation curve, free not to pass through the origin, $\mu_i = f(G_i, B_{[avg/p]})$ including the pair or pairs ($\mu_i$, $G_i$), in which $\mu_i$ is different from zero, determining an indicator of the average slope $\alpha_2$ of the second variation curve, as long as the difference between $\alpha_1$ and $\alpha_2$ is below a predetermined slope threshold, repeating the previous operations for each new acquisition of the pair of values ($G_i$, $\mu_i$), as soon as the difference between $\alpha_1$ and $\alpha_2$ exceeds the predetermined slope threshold and determining a target slip $G^{Cavg}$ using at least the last pair of values ($G_i$, $\mu_i$).

32 Claims, 2 Drawing Sheets

U.S. PATENT DOCUMENTS

| | | | |
|---|---|---|---|
| 4,715,662 A | 12/1987 | van Zanten et al. | 303/109 |
| 4,794,538 A | 12/1988 | Cao et al. | 701/74 |
| 5,343,918 A | 9/1994 | Fontaine | 152/209.5 |
| 5,402,345 A | 3/1995 | Kost | 364/426.02 |
| 5,409,302 A | 4/1995 | Chabbert | 303/112 |
| 5,513,907 A | 5/1996 | Kiencke et al. | 303/150 |
| 5,641,212 A | 6/1997 | Sakai | 303/147 |
| 5,814,718 A | 9/1998 | Andresen et al. | 73/9 |
| 5,816,666 A | 10/1998 | Wiss | 303/113.4 |
| 6,015,192 A | 1/2000 | Fukumura | 303/140 |
| 6,092,415 A | 7/2000 | Borenius et al. | 73/146.2 |
| 6,233,505 B1 | 5/2001 | Kranz et al. | 701/1 |
| 6,285,280 B1 | 9/2001 | Wang | 340/444 |
| 6,449,542 B1 | 9/2002 | Böttiger et al. | 701/41 |
| 6,550,320 B1 | 4/2003 | Giustino | 73/146 |
| 2002/0010537 A1 | 1/2002 | Yamaguchi et al. | 701/80 |
| 2002/0111752 A1 | 8/2002 | Nakamura | 702/42 |
| 2004/0024514 A1 | 2/2004 | Levy et al. | 701/82 |
| 2004/0032165 A1 | 2/2004 | Levy et al. | 303/150 |
| 2004/0049303 A1 | 3/2004 | Levy et al. | 700/80 |
| 2004/0225423 A1 | 11/2004 | Carlson et al. | 701/36 |

FOREIGN PATENT DOCUMENTS

| | | |
|---|---|---|
| DE | 42 18 034 A1 | 9/1993 |
| DE | 43 29 745 C1 | 7/1994 |
| DE | 44 35 448 A1 | 4/1995 |
| DE | 101 28 675 A1 | 1/2002 |
| DE | 101 56 823 A1 | 6/2002 |
| EP | 0 716 948 A2 | 6/1996 |
| EP | 0 829 401 A2 | 3/1998 |
| EP | 1 000 838 A2 | 5/2000 |
| EP | 1 371 534 A1 | 12/2003 |
| FR | 2816402 | 5/2002 |
| FR | 2 840 867 | 12/2003 |
| WO | WO 01/36240 A1 | 5/2001 |
| WO | WO 01/76925 | 10/2001 |
| WO | WO 01/87647 | 11/2001 |

OTHER PUBLICATIONS

Yamazaki Shun'ichi., "The Determination of Tire Parameter for Real Time Estimation of Tire and Road Friction," Jidosha Gijutsukai Koenkai Maezurishu, 1997, No. 971, p. 165-168 (Abstract).

Sakai Tomotsugu "Investigation of Lambourn Wear Test Conditions to Evaluate Tire Wear Life," Toyota Motor Corp., Proceedings of the International Sessions JSME Spring Annual Meeting, 1996, vol. 73, p. 33-34 (Abstract).

SYSTEM FOR CONTROLLING THE STABILITY OF A VEHICLE USING AN ALGORITHM COMPARING AVERAGE SLOPES OF VARIATION OF A PARAMETER

CROSS-REFERENCE TO RELATED APPLICATIONS

This application claims benefit of French Application Patent No. 04/00423, filed Jan. 16, 2004, and French Application Patent No. 04/00424, filed Jan. 16, 2004, both of which are incorporated herein by reference in their entirety.

BACKGROUND OF THE INVENTION

1. Field of the Invention

The present invention relates to vehicle stability control systems. In a particular application, the invention relates to systems aimed at preventing the locking of the wheels during hard braking, popularized by the term "ABS". More generally, the invention concerns all systems aimed at maintaining the vehicle on a stable path by acting automatically on actuators such as those determining a wheel driving or braking torque, or those determining the steering of one or more wheels, or even those concerning the suspension, where it is known that this also has an effect on the control of the path (for example active antiroll). In the particular application mentioned above, the actuators are the brakes on a wheel or the device imposing a driving torque on a wheel.

The present invention also relates to methods of testing tires.

2. Description of Related Art

For information, the longitudinal coefficient of friction $\mu$ of the tire is the quotient of the longitudinal force divided by the vertical force applied, that is to say the load applied on the tire (in the simplified case of a pure braking force, and a person skilled in the art will easily know how to apply this more generally); the slip G on the tire is G=0% when there is no slip between the speed of the tire and the speed of the vehicle, that is to say if the tire is rolling freely, and G=100% if the tire is locked rotationally. Typically, according to the environment (the nature of the ground (asphalt, concrete), dry or wet (height of water), temperature and level of wear on the tire), the value of $\mu$ as a function of the slip G and the nature of the ground may vary enormously ($\mu_{max}$ equals approximately 0.15 on ice and approximately 1.2 on dry ground).

It is known that the braking of the vehicle will be all the more effective when it is managed to make the tread function at a slip G corresponding to the maximum value of the coefficient of friction (sometimes also referred to as the coefficient of adherence). The maximum value of the coefficient of friction is termed $\mu_{max}$. However, the average driver is not capable of tuning out the braking so as to satisfy this condition.

This is why vehicle stability control systems have been developed, automatically modulating the braking force so as to aim at a predetermined slip target, and deemed to correspond to the maximum of the coefficient of friction.

In particular, U.S. Patent Application Publication. No. 2004/0032165 A1, published Feb. 19, 2004, and which is incorporated herein by reference in its entirety, proposes a method of regulating the slip using a quantity called the "Invariant", which the research of the inventors made possible to discover, this quantity being called like this because it is substantially constant whatever the tire in question and whatever the adhesion of the ground on which the tire is rolling.

Also, through U.S. Patent Application Publication. No. 2004/0024514, published Feb. 5, 2004, and which is incorporated herein in its entirety, a method of regulating slip using the same quantity called the "Invariant", has been proposed. Though this method makes it possible to determine a slip target which is actually much closer to the real maximum coefficient of friction of the tire under actual rolling conditions, there do however exist cases where it is possible to determine an even better target for improving the effectiveness of the braking (or of the acceleration).

SUMMARY OF THE INVENTION

The invention proposes an algorithm termed the "Average" algorithm for predicting an ideal target for a parameter whose control is provided in a vehicle stability control system or in a method for testing a tire.

In a general formulation, the invention proposes a vehicle stability control system in which a characteristic parameter Q of the functioning of a tire of the vehicle intended to roll on the ground varies as a function of a parameter P according to a particular law, an optimum value of the parameter P being imposed by a controller directly or indirectly so as to act on at least one of the elements chosen from the group comprising the rotation torque applied to the tire, the steering angle of the tire, the camber angle of the tire and the vertical force applied to the tire, in which the controller comprises means for:

determining coefficients $A_{[avg/p]}$ by direct calculation or by an appropriate regression, from a sufficient number of pairs $(P_i, Q_i)$, so as to model a first variation curve $Q_i=f(P_i, A_{[avg/p]})$ necessarily including by convention the origin, and the pair or pairs $(Q_i, P_i)$, in which $Q_i$ is different from zero, determining an indicator of the average slope $\alpha_1$ of the first variation curve, determining coefficients $B_{[avg/p]}$ by direct calculation or by an appropriate regression, from a sufficient number of pairs $(Q_i, P_i)$, so as to model a second variation curve $Q_i=f(P_i, B_{[avg/p]})$ including the pair or pairs $(Q_i, P_i)$, in which $Q_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values $(P_i, Q_i)$, as soon as the difference between $\alpha_1$ and $\alpha_2$ exceeds the predetermined slope threshold, determining a target slip $P^{C_{avg}}$ using at least the last pair of values $(P_i, Q_i)$.

The result sought is to maintain the value of a parameter Q at a value chosen as being ideal in the situation of the vehicle at the time. In the present document, a detailed description is given of an application to the control of the slip of a tire, typically during a braking maneuver or during a maneuver acting on the yawing of a vehicle (a function known by the term ABS in the first case or a function known by the name ESP in the second case). Finally, an application is mentioned aimed at controlling the path using actuators other than those acting on the torque at the wheels.

In a first application, the invention therefore proposes a vehicle stability control system in which the parameter P is the slip G on the tire and the characteristic parameter Q is the coefficient of friction $\mu$ of the tire, the system comprising means for imparting a longitudinal force to the tire, means of modulating the longitudinal force and means for calculating the slip parameter $G^{Opt}$ at each activation of the means for imparting a longitudinal force to the tire in the following manner:

determining coefficients $A_{[avg/p]}$ by direct calculation or by an appropriate regression, from a sufficient number of pairs ($\mu_i$, $G_i$), so as to model a first variation curve $\mu_i = f(G_i, A_{[avg/p]})$ necessarily including by convention the origin, and the pair or pairs ($\mu_i$, $G_i$), in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs ($\mu_i$, $G_i$), so as to model a second variation curve $\mu_i = f(G_i, B_{[avg/p]})$ including the pair or pairs ($\mu_i$, $G_i$), in which $\mu_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values ($G_i$, $\mu_i$), as soon as the difference between $\alpha_1$ and $\alpha_2$ exceeds the predetermined slope threshold, determining a target slip $G^{Cavg}$ using at least the last pair of values ($G_i$, $\mu_i$).

The application of choice of the present invention lies in the control of the slipping of a wheel in braking, for the purpose of making the tire function at the level where the coefficient of friction is at a maximum. The entire following description in this case concerns a device for modulating the longitudinal force which acts on the braking control. It should be indicated once and for all that, in this case, the operations indicated above, and in more detail below, are initialized (i=0) at each start of a braking maneuver. However, if it is decided to apply the present invention to the control of the slipping of a wheel in acceleration, the device modulating the longitudinal force acts on the driving torque at the wheels and the operations indicated at each request for a variation in the driving torque greater than a predetermined torque threshold are initialized (i=0).

It should also be noted that, in the context of the present invention, it is of little importance whether the tread whose adhesion characteristic is processed is that of a pneumatic tire or a non-pneumatic elastic solid tire or a track. The terms "tread", "tire" or "pneumatic tire", "solid tire", "elastic tire", "track" or even "wheel" must be interpreted as equivalent. It should also be noted that the determination of the values of the coefficient of friction $\mu_i$ for each slip $G_i$ may be carried out by direct measurement or by estimation from other measurements or from the estimation of other quantities such as the force in the plane of the ground and the vertical load.

Similarly, in another aspect of the invention, the invention proposes a tire testing system in which a characteristic parameter Q of the functioning of a tire intended to roll on the ground varies as a function of a parameter P according to a particular law, an optimum value of the parameter P being imposed by a controller directly or indirectly so as to act on at least one of the elements chosen from the group comprising the rotation torque applied to the tire, the steering angle of the tire, the camber angle of the tire and the vertical force applied to the tire, in which the controller comprises means for:

determining coefficients $A_{[avg/p]}$ by direct calculation or by an appropriate regression, from a sufficient number of pairs ($P_i$, $Q_i$), so as to model a first variation curve $Q_i = f(P_i, A_{[avg/p]})$ necessarily including by convention the origin, and the pair or pairs ($Q_i$, $P_i$), in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs ($Q_i$, $P_i$), so as to model a second variation curve $Q_i = f(P_i, B_{[avg/p]})$ including the pair or pairs ($Q_i$, $P_i$), in which $Q_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values ($P_i$, $Q_i$), as soon as the difference between $\alpha_1$ and $\alpha_2$ exceeds the predetermined slope threshold, determining a target slip $P^{Cavg}$ using at least the last pair of values ($P_i$, $Q_i$).

The result sought is to maintain the value of a parameter Q at a value chosen according to the objective of the test. In the present document, an application to the control of the slip of a tire, typically during a braking maneuver, is described in detail. Finally, an application is mentioned aimed at controlling the drift of the tire.

In the first case, the parameter P is the slip G of the tire and the characteristic parameter Q is the coefficient of friction $\mu$ of the tire, the invention proposing a tire test system using means for imparting a longitudinal force to a tire intended to roll on the ground, means of modulating the longitudinal force using at least one "target slip" parameter which is the slip aimed at in the rotation of the tire on the ground, and means for calculating the parameter $G^{Opt}$ at each activation of the means for imparting a longitudinal force to the tire, for successive levels "i" of the longitudinal force each corresponding to a slip $G_i$, in the following manner:

determining coefficients $A_{[avg/p]}$ by direct calculation or by an appropriate regression, from a sufficient number of pairs ($\mu_i$, $G_i$), so as to model a first variation curve $\mu_i = f(G_i, A_{[avg/p]})$ necessarily including by convention the origin, and the pair or pairs ($\mu_i$, $G_i$), in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs ($\mu_i$, $G_i$), so as to model a second variation curve $\mu_i = f(G_i, B_{[avg/p]})$ including the pair or pairs ($\mu_i$, $G_i$), in which $\mu_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values ($G_i$, $\mu_i$), as soon as the difference between $\alpha_1$ and $\alpha_2$ exceeds the predetermined slope threshold, determining a target slip $G^{Cavg}$ using at least the last pair of values ($G_i$, $\mu_i$).

The application of choice of the present invention lies in the control of the slipping of a wheel in braking on a machine or test vehicle. The entire following description in this case concerns a device for modulating the longitudinal force which acts on the braking control. It should be indicated once and for all that, in this case, the operations indicated above, and in more detail below, are initialized (i=0) at each start of a braking maneuver. However, if it is decided to apply the present invention to the control of the slipping of a wheel in acceleration, the device modulating the longitudinal force acts on the driving torque at the wheels and the operations indicated at each request for a variation in the driving torque greater than a predetermined torque threshold are initialized (i=0).

DETAILED DESCRIPTION OF THE PREFERRED EMBODIMENTS

The "Average" algorithm consists of detecting the change in the curvature of the curve µ(G). It will be understood in fact that such a change reveals the proximity of the maximum adhesion. For this, the measurements or estimations are processed of the slip and coefficient of friction values associated with two regressions, one of which aims to model a variation curve which necessarily passes through the origin and the other one of which aims to model a variation curve which does not necessarily pass through the origin, that is to say whose first point is left free.

Preferably, a second condition is added causing the determination of the target slip using at least the last pair of values ($G_i$, $µ_i$), the second condition being as soon as $G_i$ exceeds a predetermined threshold, for example 15%.

Figure 1:
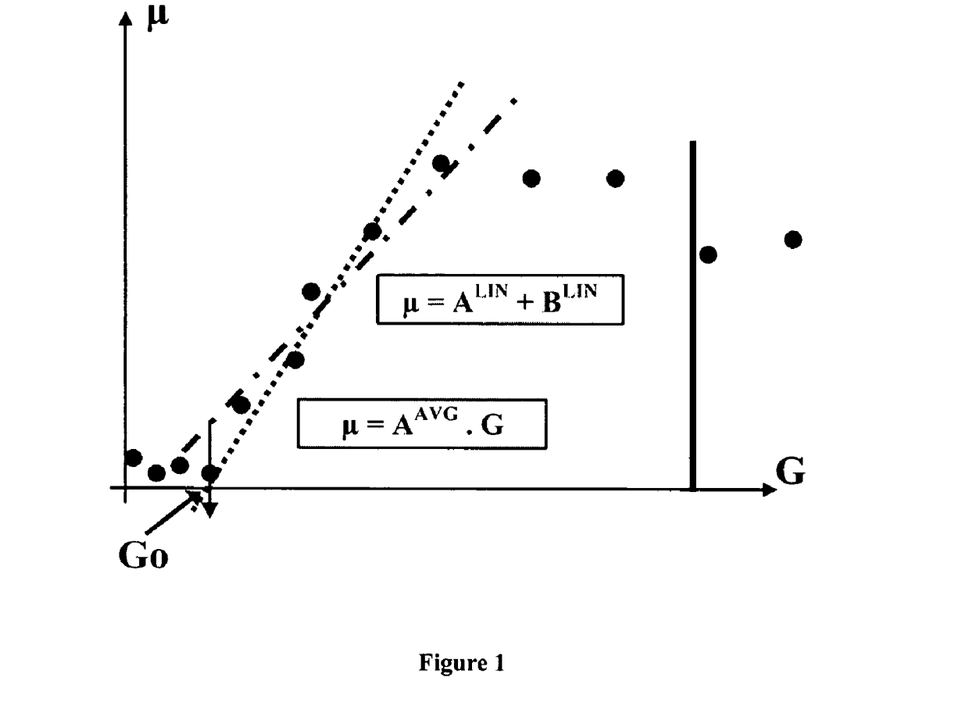
FIG. 1 illustrates the Average algorithm.

The use of linear regressions is particularly indicated. In this case, the difference between two linear regressions is looked at, as illustrated in FIG. 1. In this case, the first variation curve, depicted by a dotted line in FIG. 1, is a first straight line $µ_i=A_{avg} \cdot G_i$, including by convention the origin (to within a correction $G_0$, a correction which will be explained later), and the pair or pairs ($µ_i$, $G_i$), obtained by a first linear regression calculating a first coefficient $A_{avg}$, the second variation curve, depicted in a dot and dash line in FIG. 1, is a second straight line $µ_i=A_{lin} \cdot G_i+B_{lin}$ (the less vertical straight line) including the pair or pairs ($µ_i$, $G_i$), which are left free not to pass through the origin, and is obtained by a second linear regression calculating coefficients $A_{lin}$ and $B_{lin}$ (which does not exclude a correction $G_0$ which will be explained later).

Naturally, since it is a case of linear regressions, the indicators are directly the respective slopes $α_1$ and $α_2$ of each of the straight lines.

It has been determined experimentally that, in the case of modeling by straight lines (linear regressions), the predetermined slope threshold for the difference between $α_1$ and $α_2$ is preferably around 30%.

In the end, the target slip $G^{Cavg}$ adopted can quite simply be equal to the last value $G_i$. As an alternative and more precisely, the target slip $G^{Cavg}=β \cdot µ^{MAX}/A^{AVG}$ is determined with β a fine-tuning parameter. When in the present document a fine-tuning parameter is spoken of, this means that, even if there exists for this parameter a value or a range of values representing a physical reality, it is possible in practice to use this parameter arbitrarily as a fine-tuning knob for the practical functioning of the system for controlling the stability of a vehicle. It can be added simply that the parameter β represents an analogy with the Invariant, which results for β in a value of approximately 1.04 to be compared with the value 0.58 for the Invariant.

Figure 2:
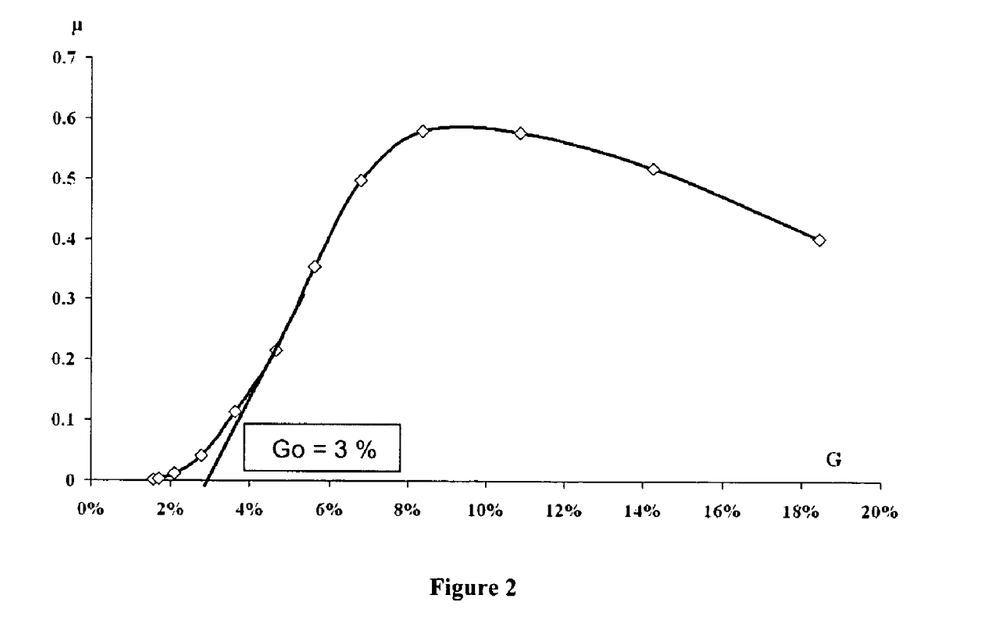
FIG. 2 illustrates a particular processing of the first acquisitions of measurements or estimations.
Figure 3:
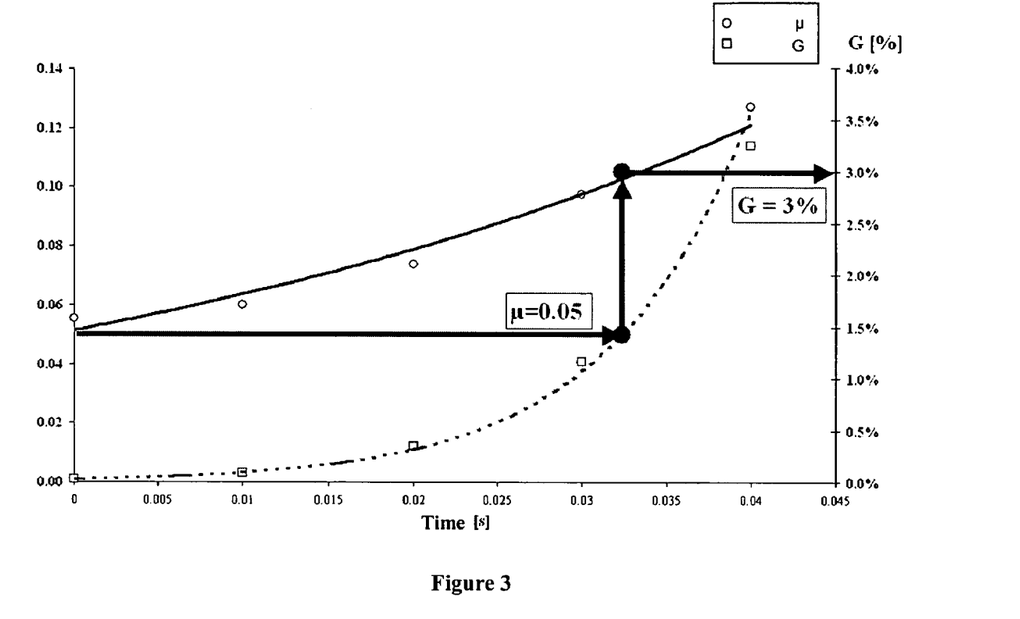
FIG. 3 illustrates the particular processing in more detail.

Before continuing, a few corrections are proposed to the low slip and coefficient of friction values obtained at the very start of a braking maneuver. At the start of braking, it has been found that the curve µ(G) can have a strange behavior. The purpose of this first part of the algorithm is to correct this behavior. In FIGS. 2 and 3, it can be seen that, on wet ground, the foot of the curve µ(G) does not seem to be linear and that, for a zero µ, the slip is not. This is probably due to errors in the value of the slip measured. This is obviously not representative of the physical phenomena in the contact of the tread on the ground. This is a nuisance for the target slip calculation algorithms, which are based on the study of the slope of the curve µ(G). Naturally, this is very dependent on the concrete technological means used on the vehicle for acquiring this information. Consequently, the indications supplied in this context are simple suggestions which it is useful to apply if dealing with this problem, but which are not limiting. More generally, it is useful to correct authoritatively the shape of the foot of the variation curve of the coefficient of friction as a function of the slip if it has a very implausible trend.

The first part of the processing of the data will therefore consist of calculating the value of the slip from which it is possible to use the data for reliably calculating a target slip or the optimum slip. Let this slip be called $G_0$. FIG. 2 shows that this slip $G_0$ is equal to approximately 3%. A more plausible trend of the curve µ(G) is obtained by linking $G_0$ to the substantially linear part of the increasing part of the curve.

Consequently the vehicle stability control system is preferably such that, before all the operations using the curve of variation of $µ_i$ as a function of $G_i$, a correction is carried out of the start of the curve by eliminating the first real pairs ($µ_i$, $G_i$) as long as the variation in $µ_i$ as a function of $G_i$ is not substantially constant and seeking the slip $G_0$ associated with a zero coefficient of friction (this is of course not limiting) such that the pair (0, $G_0$) and the non-eliminated pairs ($µ_i$, $G_i$) are substantially aligned, and using a curve starting from (0, $G_0$) and joining the non-eliminated pairs ($µ_i$, $G_i$), so that, for any value of $G_i$ greater than $G_0$, $G_i$ is replaced by $G_i-G_0$.

For this, for example, an algorithm is used which comprises the following steps:

systematically eliminating all the slip values associated with a coefficient of friction of less than 0.01;

continuously calculating regressions of µ and G as a function of time, preferably exponential regressions having regard to the trend of the foot of the curve in the example illustrated by means of FIG. 2 and FIG. 3:

$$µ=e^{A^µ \cdot (t-T^{Start})+B^µ}, G=e^{A^G \cdot (t-T^{Start})+B^G}$$

It can be considered that the acquired values represent reality when the estimated or measured coefficient of friction is greater than 0.1 or when the slip exceeds 4%.

FIG. 3 illustrates the way of determining $G_0$ from curves giving the values acquired respectively for the coefficient of friction as a function of time and for the slip as a function of time. The value of the time for which the regression on the curve of µ is equal to a certain value, for example 0.05 (see the horizontal segment between a zero X-axis value and a Y-axis value equal to 0.05 and the dotted-line curve), is sought. The value of $G_0$ will be the value of the regression on the curve of the slip at this moment (see the vertical segment between the point previously obtained and a point on the curve in a continuous line, giving the value of the slip $G_0$).

Therefore, before all the operations using the curve of variation of $µ_i$ as a function of $G_i$, a correction is carried out of the start of the curve by eliminating the first real pairs ($µ_i$, $G_i$) as long as the variation in $\mu_i$ as a function of $G_i$ is not substantially constant and finding the slip $G_0$ associated with a zero coefficient of friction such that the pair $(0, G_0)$ and the non-eliminated pairs $(\mu_i, G_i)$ are substantially aligned, and using a curve starting from $(0, G_0)$ and joining the non-eliminated pairs $(\mu_i, G_i)$. Next, in all the algorithms used, for any value of $G_i$ greater than $G_0$, $G_i$ is replaced by $G_i - G_0$.

Figure 4:
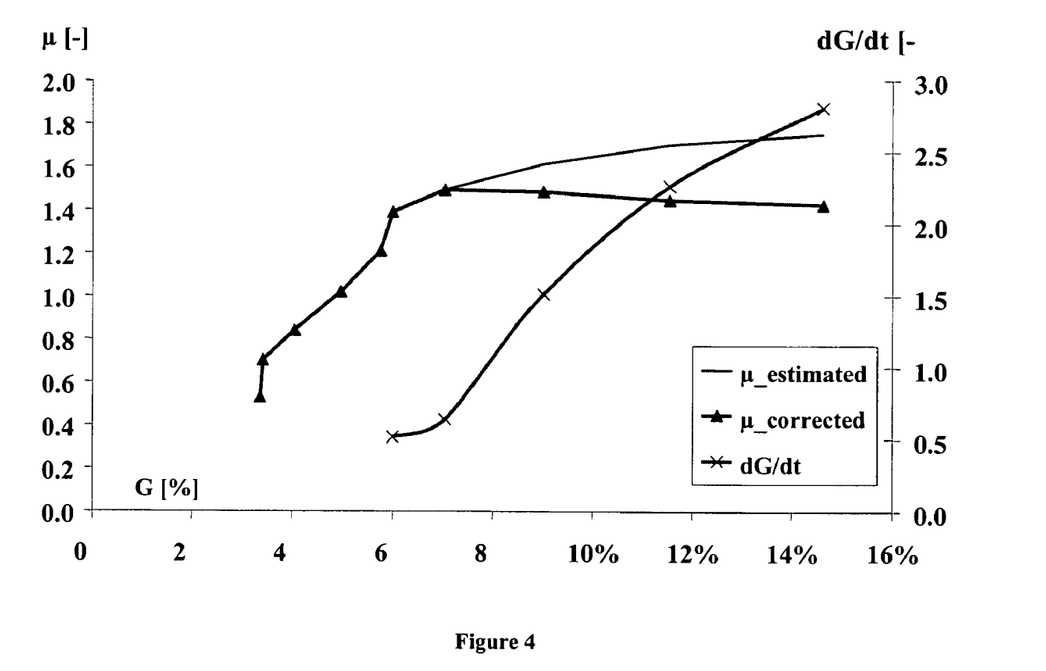
FIG. 4 illustrates another particular processing of the acquisitions of measurements or estimations.

Up till now it has been assumed that values of $\beta$ have been calculated or estimated. However, in certain cases, the method of obtaining the coefficient of friction (from the braking force itself estimated on the basis of the braking pressure having regard to the particular characteristics of each vehicle —or the braking system of a tire test bench— and from the speed of the wheel) does not give a satisfactory result (the curve $\mu(G)$ calculated is too flat or continuously ascending). It is known that this is not realistic. To correct this problem, a numerical correction of the $\mu$ calculated can be introduced. This correction is based on the rate of change of the slip as a function of time. This is because, if the speed of the wheel (and therefore the slip) takes off quickly, it is because the unstable zone of the curve $\mu(G)$ is involved. Therefore the curve $\mu(G)$ should decrease, which is taken advantage of as follows:

$$\mu^{Corr} = \mu^{acquired} \cdot \left[\text{Max}\left(\frac{dG}{dt}; 1\right)\right]^{-ACorr}$$

where "Acorr" is a fine-tuning coefficient and can be specific to each algorithm. For example, a good practical value has proved to be 0.2 for the "Average" algorithm. FIG. 4 illustrates this correction. By virtue of this correction, the curve $\mu(G)$ regains a shape certainly more in accordance with physical reality, which enables the algorithms to produce reliable targets.

It should be noted that, if the value of $\mu_{max}$ is in itself modified by this correction, all the algorithms used are based on the shape of the curve rather than its values. The reader is also referred to the aforementioned patent application (U.S. Patent Application Publication. No. 2004/0032165 A1) where the fact is brought out that the "Invariant" algorithm makes it possible to calculate a slip target without even calculating the exact value of the associated coefficient of friction, the latter being unnecessary to the correct functioning of the slip control of a vehicle wheel.

In the aforementioned patent applications, the possibility of other applications of the "Invariant" algorithm was demonstrated, for example to the analysis of the drift thrust developed by a pneumatic tire or elastic solid tire in an operating zone close to the saturation of the drift thrust. It is because of the similarity in the variation laws of these physical phenomena. In the same way, the present invention has broader applications than solely the control of the slip in a vehicle stability control system or than controlling the slip during a test on the tire. In order to close the subject, let us simply cite (without even this addition being limiting, as will have been understood) that the invention also applies to a vehicle stability control system aimed at predicting the value of the drift angle $\delta$ of a pneumatic tire where the lateral force (also referred to as the "drift thrust") is at a maximum, and also that the invention applies to a tire testing system aimed at predicting the value of the drift angle $\delta$ of a pneumatic tire where the lateral force (also referred to as the "drift thrust") is at a maximum. It is a case of predicting when the tire will reach its maximum and therefore will no longer be capable of maintaining the drift thrust, in order to be able to maintain the functioning of the tire at a predetermined value of the drift thrust $F_{det}$. In order to maintain the functioning of the tire at a predetermined value, it is therefore also useful to estimate a target for the drift angle by means of an "Average" algorithm.

In this case, the parameter P is the drift angle $\delta$ of the tire and the characteristic parameter Q is the drift thrust $F^{det}$ of the tire. It is a case of predicting when the tire will reach its maximum and therefore will no longer be capable of meeting its prime function, which is to enable the vehicle to turn, in order to be able to maintain the functioning of the tire at a predetermined value of the drift thrust $F^{det}$, or to warn the driver. To maintain the functioning of the tire at a predetermined target value, it is possible to carry out, possibly automatically, preventive interventions for reducing the speed of the vehicle in order to avoid critical driving situations (if the vehicle is not running as the driver wishes, an accident may result therefrom). In order to carry out these actions advisedly, it is therefore also useful to estimate a target by means of an "Average" algorithm.

In the application to vehicle dynamic management systems, the invention oncerns a system comprising means for controlling a parameter "$\xi$" according to instructions entered by the driver of the vehicle on his control means and according to instructions delivered by a path controller, means of modulating the parameter "$\xi$" and means for calculating the angle of drift parameter $\delta^{Opt}$ whenever means are activated for entering the parameter "$\xi$" in the following manner:

each time the system for controlling the variation in $\xi$ is activated, for at least two different levels "i" of drift angle, reading various values of $F_{yi}$ (measured or calculated), and the associated drift angle $\delta_i$ obtained by estimation or direct measurement, determining coefficients $A_{[avg/p]}$ by direct calculation or by an appropriate regression, from a sufficient number of pairs $(F_i, \delta_i)$, so as to model a first variation curve $F_i = f(\delta_i, A_{[avg/p]})$ necessarily including by convention the origin, and the pair or pairs $(F_i, \delta_i)$, in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs $(F_i, \delta_i)$, so as to model a second variation curve $F_i = f(\delta_i, B_{[avg/p]})$ including the pair or pairs $(F_i, \delta_i)$, in which $\mu_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values $(\delta_i, F_i)$, as soon as the difference between $\alpha_1$ and $\alpha_2$ exceeds the predetermined slope threshold, determining a target slip $G^{Cavg}$ using at least the last pair of values $(\delta_i, F_i)$.

In the application for testing the tires, the invention concerns a system for the slip testing of a tire, using means for imparting a drift angle to a tire under test on the ground, the means being equipped with a system of controlling a parameter "$\xi$" according to instructions coming from a test control means, and according to instructions delivered by a controller aimed at maintaining the functioning of the tire at a predetermined value of the drift thrust $F^{det}$, the controller using at least one optimum value $\delta^{Opt}$ of the drift angle corresponding to the maximum value of the drift thrust $F^{det}$, the controller comprising means for performing the following operations:

each time the system for controlling the variation in ξ is activated, for at least two different levels "i" of drift angle, reading various values of $F_{yi}$, and the associated drift angle $\delta_i$ obtained by estimation or direct measurement, determining coefficients $A_{[avg/p]}$ by direct calculation or by an appropriate regression, from a sufficient number of pairs $(F_i, \delta_i)$, so as to model a first variation curve $F_i=f(\delta_i, A_{[avg/p]})$ necessarily including by convention the origin, and the pair or pairs $(F_i, \delta_i)$, in which $\mu_i$ is different from zero, determining an indicator of the average slope $\alpha_1$ of the first variation curve, determining coefficients $B_{[avg/p]}$ by direct calculation or by an appropriate regression, from a sufficient number of pairs $(F_i, \delta_i)$, so as to model a first second variation curve $F_i=f(\delta_i, B_{[avg/p]})$ including the pair or pairs $(F_i, \delta_i)$, in which $\mu_i$ is different from zero, determining an indicator of the average slope $\alpha_2$ of the second variation curve, as long as the difference between $\alpha_1$ and $\alpha_2$ is less than a predetermined slope threshold, repeating the previous operations for each new acquisition of a pair of values $(\delta_i, F_i)$, as soon as the difference between $\alpha_1$ and $\alpha_2$ exceeds the predetermined slope threshold, determining a target slip $G^{Cavg}$ using at least the last pair of values $(\delta_i, F_i)$.

What is claimed is:

1. A vehicle stability control system in which a characteristic parameter Q of a functioning of a tire of the vehicle intended to roll on the ground varies as a function of a parameter P according to a certain law, an optimum value of the parameter P being imposed by a controller directly or indirectly, so as to act on at least one of elements chosen from a group comprising a rotation torque applied to the tire, a steering angle of the tire, a camber angle of the tire, and a vertical force applied to the tire, in which the controller comprises means for:

determining coefficients $A_{[avg/p]}$, by direct calculation or by a regression, from a sufficient number of pairs $(P_i, Q_i)$, so as to model a first variation curve $Q_i=f(P_i, A_{[avg/p]})$ including the origin, and the pair or pairs $(Q_i, P_i)$, in which $Q_i$ is different from zero, determining an indicator of an average slope $\alpha_1$ of the first variation curve, determining coefficients $B_{[avg/p]}$, by direct calculation or by a regression, from a sufficient number of pairs $(Q_i, P_i)$, so as to model a second variation curve $Q_i=f(P_i, B_{[avg/p]})$ including the pair or pairs $(Q_i, P_i)$, in which $Q_i$ is different from zero, determining an indicator of an average slope $\alpha_2$ of the second variation curve, as long as the difference between $\alpha_1$ and $\alpha_2$ is less than a predetermined slope threshold, repeating the previous operations for each new acquisition of a pair of values $(P_i, Q_i)$, if the difference between $\alpha_1$ and $\alpha_2$ exceeds the predetermined slope threshold, determining a target slip $P^{Cavg}$ using at least the last pair of values $(P_i, Q_i)$.

2. The vehicle stability control system according to claim 1, in which the parameter P is the drift angle $\delta$ of the tire and the characteristic parameter Q is the drift thrust $F_y$ of the tire, the system comprising means for controlling a parameter "ξ" according to instructions entered by a driver of the vehicle on a control means and according to instructions delivered by a path controller, means of modulating the parameter "ξ" and means for calculating the drift angle parameter $\delta^{Opt}$ at each activation of the means for entering the parameter "ξ" in the following manner:

each time the system for controlling the variation in ξ is activated, for different levels "i" of drift angle, reading a plurality of values of $F_{yi}$, and the associated drift angle $\delta_i$ obtained by estimation or direct measurement, determining coefficients $A_{[avg/p]}$ by direct calculation or by a regression, from a sufficient number of pairs $(F_i, \delta_i)$, so as to model a first variation curve $F_i=f(\delta_i, A_{[avg/p]})$ including the origin, and the pair or pairs $(F_i, \delta_i)$, in which $\mu_i$ is different from zero, determining an indicator of an average slope $\alpha_1$ of the first variation curve, determining coefficients $B_{[avg/p]}$ by direct calculation or by a regression, from a sufficient number of pairs $(F_i, \delta_i)$, so as to model a second variation curve $F_i=f(\delta_i, B_{[avg/p]})$ including the pair or pairs $(F_i, \delta_i)$, in which $\mu_i$ is different from zero, determining an indicator of an average slope $\alpha_2$ of the second variation curve, as long as a difference between $\alpha_1$ and $\alpha_2$ is less than a predetermined slope threshold, repeating the previous operations for each new acquisition of a pair of values $(\delta_i, F_i)$, if the difference between $\alpha_1$ and $\alpha_2$ exceeds the predetermined slope threshold, determining a target slip $G^{Cavg}$ using at least the last pair of values $(\delta_i, F_i)$.

3. A vehicle stability control system, in which a parameter G is a slip of a tire and a characteristic parameter $\mu$ is a coefficient of friction of the tire, the system comprising means for imparting a longitudinal force to the tire, means of modulating the longitudinal force, and means for calculating an optimal slip parameter $G^{Opt}$ at each activation of the means for imparting a longitudinal force to the tire in the following manner:

determining coefficients $A_{[avg/p]}$ by direct calculation or by a regression, from a sufficient number of pairs $(\mu_i, G_i)$, so as to model a first variation curve $\mu_i=f(G_i, A_{[avg/p]})$ including the origin, and the pair or pairs $(\mu_i, G_i)$, in which $\mu_i$ is different from zero, determining an indicator of an average slope $\alpha_1$ of the first variation curve, determining coefficients $B_{[avg/p]}$ by direct calculation or by a regression, from a sufficient number of pairs $(\mu_i, G_i)$, so as to model a second variation curve $\mu_i=f(G_i, B_{[avg/p]})$ including the pair or pairs $(\mu_i, G_i)$, in which $\mu_i$ is different from zero, determining an indicator of an average slope $\alpha_2$ of the second variation curve, as long as a difference between $\alpha_1$ and $\alpha_2$ is less than a predetermined slope threshold, repeating the previous operations for each new acquisition of a pair of values $(G_i, \mu_i)$, if the difference between $\alpha_1$ and $\alpha_2$ exceeds the predetermined slope threshold, determining a target slip $G^{Cavg}$ using at least the last pair of values $(G_i, \mu_i)$.

4. The vehicle stability control system according to claim 3, in which, when the slip $G_i$ exceeds a predetermined threshold, the target slip $G^{Cavg}$ is determined using at least the last pair of values $(G_i, \mu_i)$.

5. The vehicle stability control system according to claim 3, in which:

the first variation curve is a first straight line $\mu_i=A_{avg} \cdot G_i$, including the origin, and the pair or pairs $(\mu_i, G_i)$, obtained by a first linear regression calculating a first coefficient $A_{avg}$, and the second variation curve is a second straight line $\mu_i = A_{lin} \cdot G_i + B_{lin}$ including the pair or pairs $(\mu_i, G_i)$, obtained by a second linear regression calculating coefficients $A_{lin}$ and $B_{lin}$.

6. The vehicle stability control system according to claim 3, in which the target slip $G^{Cavg}$ is determined as being equal to the last value $G_i$.

7. The vehicle stability control system according to claim 3, in which the target slip is determined by $$G^{Cavg} = \beta \cdot \frac{\mu^{MAX}}{A^{AVG}},$$

in which $\beta$ is a fine-tuning parameter.

8. The vehicle stability control system according to claim 7, in which $\beta$ is equal to approximately 1.04.

9. The vehicle stability control system according to claim 7, in which $\beta$ is a fine-tuning parameter used in the fine-tuning of the system.

10. The vehicle stability control system according to claim 3, in which the predetermined slope threshold for the difference between $\alpha_1$ and $\alpha_2$ is around 30%.

11. The vehicle stability control system according to claim 3, in which the means for modulating the longitudinal force acts on a braking control and is initialized (with i=0) at a start of each braking control operation.

12. The vehicle stability control system according to claim 3, in which the means for modulating the longitudinal force acts on the driving torque at the wheels and is initialized (i=0) at each request for a variation in the driving torque above a predetermined torque threshold.

13. The vehicle stability control system according to claim 3, in which, before obtaining the target values for the slip using a curve comprising the determined values of $\mu_i$ as a function of $G_i$, a correction of a start of the curve is carried out by:
eliminating from the curve at least a first real pair $(\mu_i, G_i)$, as long as the variation in $\mu_i$ as a function of $G_i$ is not substantially constant,
seeking the slip $G_0$ associated with a zero coefficient of friction, such that the pair $(0, G_0)$ and non-eliminated pairs $(\mu_i, G_i)$ are substantially aligned, and
using a curve starting from $(0, G_0)$ and joining the non-eliminated pairs $(\mu_i, G_i)$, so that, for any value of $G_i$ greater than $G_0$, $G_i$ is replaced by $G_i - G_0$.

14. The vehicle stability control system according to claim 3, in which, when the variation in the slip with respect to time becomes greater than a predetermined variation threshold, before obtaining the target values for the slip using a curve comprising the determined values of $\mu_i$ as a function of $G_i$, a correction to the end of the curve is carried out, by replacing the values of $\mu_i$ corresponding to the values of slip that result in the variation in the slip with respect to time being beyond the predetermined variation threshold, by corrected values as follows:

$$\mu_i^{Corr} = \mu_i \cdot \left[ Max\left(\frac{dG}{dt}; 1\right) \right]^{-ACorr}$$

where "Acorr" is a preset parameter.

15. The vehicle stability control system according to claim 14, in which "Acorr" is equal to approximately 0.2.

16. The vehicle stability control system according to claim 14, in which "Acorr" is used as a fine-tuning parameter.

17. A tire testing system in which a characteristic parameter Q of a functioning of a tire under test varies as a function of a parameter P according to a certain law, an optimum value of the parameter P being imposed by a controller directly or indirectly, so as to act on at least one of elements chosen from a group comprising a rotation torque applied to the tire, a steering angle of the tire, a camber angle of the tire, and a vertical force applied to the tire, in which the controller comprises means for:
determining coefficients $A_{[avg/p]}$ by direct calculation or by a regression, from a sufficient number of pairs $(P_i, Q_i)$, so as to model a first variation curve $Q_i = f(P_i, A_{[avg/p]})$ including the origin, and the pair or pairs $(Q_i, P_i)$, in which $\mu_i$ is different from zero,
determining an indicator of an average slope $\alpha_1$ of the first variation curve,
determining coefficients $B_{[avg/p]}$ by direct calculation or by a regression, from a sufficient number of pairs $(Q_i, P_i)$, so as to model a second variation curve $Q_i = f(P_i, B_{[avg/p]})$ including the pair or pairs $(Q_i, P_i)$, in which $Q_i$ is different from zero,
determining an indicator of an average slope $\alpha_2$ of the second variation curve,
as long as a difference between $\alpha_1$ and $\alpha_2$ is less than a predetermined slope threshold, repeating the previous operations for each new acquisition of a pair of values $(P_i, Q_i)$,
if the difference between $\alpha_1$ and $\alpha_2$ exceeds the predetermined slope threshold, determining a target slip $P^{Cavg}$ using at least the last pair of values $(P_i, Q_i)$.

18. The tire testing system according to claim 17, using means for imparting a drift angle to a tire under test on the ground, the means being equipped with a system for controlling a parameter "$\xi$" according to instructions coming from a test control means and according to instructions delivered by a controller aimed at maintaining the functioning of the tire at a predetermined value of the drift thrust $F^{det}$, the controller using at least one optimum value $\delta^{Opt}$ of the drift angle corresponding to the maximum value of the drift thrust $F^{det}$, the controller comprising means for performing the following operations:
each time the system for controlling the variation in $\xi$ is activated, for different levels "i" of drift angle, reading a plurality of values of $F_{yi}$, measured or calculated, and an associated drift angle $\delta_i$, obtained by estimation or direct measurement,
determining coefficients $A_{[avg/p]}$ by direct calculation or by a regression, from a sufficient number of pairs $(F_i, \delta_i)$, so as to model a first variation curve $F_i = f(\delta_i, A_{[avg/p]})$ including the origin, and the pair or pairs $(F_i, \delta_i)$, in which $\mu_i$ is different from zero,
determining an indicator of an average slope $\alpha_1$ of the first variation curve,
determining coefficients $B_{[avg/p]}$ by direct calculation or by a regression, from a sufficient number of pairs $(F_i, \delta_i)$, so as to model a second variation curve $F_i = f(\delta_i, B_{[avg/p]})$ including the pair or pairs $(F_i, \delta_i)$, in which $\mu_i$ is different from zero,
determining an indicator of an average slope $\alpha_2$ of the second variation curve,
as long as a difference between $\alpha_1$ and $\alpha_2$ is less than a predetermined slope threshold, repeating the previous operations for each new acquisition of a pair of values ($\delta_i$, $F_i$), if the difference between $\alpha_1$ and $\alpha_2$ exceeds the predetermined slope threshold, determining a target slip $G^{Cavg}$ using at least the last pair of values ($\delta_i$, $F_i$).

19. A tire testing system, in which a parameter G is a slip of the tire and a characteristic parameter $\mu$ is a coefficient of friction of the tire, the system comprising means for imparting a longitudinal force to the tire, means for modulating the longitudinal force and means for calculating a slip parameter $G^{Opt}$ at each activation of the means for imparting a longitudinal force to the tire in the following manner:

determining coefficients $A_{[avg/p]}$ by direct calculation or by a regression, from a sufficient number of pairs ($\mu_i$, $G_i$), so as to model a first variation curve $\mu_i = f(G_i, A_{[avg/p]})$ including the origin, and the pair or pairs ($\mu_i$, $G_i$), in which $\mu_i$ is different from zero, determining an indicator of an average slope $\alpha_1$ of the first variation curve, determining coefficients $B_{[avg/p]}$ by direct calculation or by a regression, from a sufficient number of pairs ($\mu_i$, $G_i$), so as to model a second variation curve $\mu_i = f(G_i, B_{[avg/p]})$ including the pair or pairs ($\mu_i$, $G_i$), in which $\mu_i$ is different from zero, determining an indicator of an average slope $\alpha_2$ of the second variation curve, as long as a difference between $\alpha_1$ and $\alpha_2$ is less than a predetermined slope threshold, repeating the previous operations for each new acquisition of a pair of values ($G_i$, $\mu_i$), if the difference between $\alpha_1$ and $\alpha_2$ exceeds the predetermined slope threshold, determining a target slip $G^{Cavg}$ using at least the last pair of values ($G_i$, $\mu_i$).

20. The tire testing system according to claim 19, in which, when the slip $G_i$ exceeds a predetermined threshold, the target slip $G^{Cavg}$ is determined using at least the last pair of values ($G_i$, $\mu_i$).

21. The tire testing system according to claim 19, in which:

the first variation curve is a first straight line $\mu_i = A_{avg} \cdot G_i$, including the origin, and the pair or pairs ($\mu_i$, $G_i$), obtained by a first linear regression calculating a first coefficient $A_{avg}$, and the second variation curve is a second straight line $\mu_i = A_{lin} \cdot B_{lin}$ including the pair or pairs ($\mu_i$, $G_i$), obtained by a second linear regression calculating coefficients $A_{lin}$ and $B_{lin}$.

22. The tire testing system according to claim 19, in which the target slip $G^{Cavg}$ is determined based on the last value $G_i$.

23. The tire testing system according to claim 19, in which the target slip is determined by $$G^{Cavg} = \beta \cdot \frac{\mu^{MAX}}{A^{AVG}},$$

in which $\beta$ is a fine-tuning parameter.

24. The tire testing system according to claim 23, in which $\beta$ is equal to approximately 1.04.

25. The tire testing system according to claim 23, in which $\beta$ is a fine-tuning parameter used in the fine tuning of the system.

26. The tire testing system according to claim 19, in which a predetermined slope threshold for the difference between $\alpha_1$ and $\alpha_2$ is around 30%.

27. The tire testing system according to claim 19, in which the means for modulating the longitudinal force acts on a braking control and is initialized (with i=0) at each start of an operation of the braking control.

28. The tire testing system according to claim 19, in which the means for modulating the longitudinal force acts on a driving torque at the wheels and is initialized (i=0) at each request for a variation in the driving torque above a predetermined torque threshold.

29. The tire testing system according to claim 19, in which, before obtaining the target values for the slip using a curve comprising the determined values of $\mu_i$ as a function of $G_i$, a correction of a start of the curve is carried out by:

eliminating from the curve at least a first real pair ($\mu_i$, $G_i$) as long as the variation in $\mu_i$ as a function of $G_i$ is not substantially constant, seeking the slip $G_0$ associated with a zero coefficient of friction, such that the pair (0, $G_0$) and non-eliminated pairs ($\mu_i$, $G_i$) are substantially aligned, and using a curve starting from (0, $G_0$) and joining the non-eliminated pairs ($\mu_i$, $G_i$), so that, for any value of $G_i$ greater than $G_0$, $G_i$ is replaced by $G_i - G_0$.

30. The tire testing system according to claim 19, in which, when the variation in the slip with respect to time becomes greater than a predetermined variation threshold, before obtaining the target values for the slip using a curve comprising the determined values of $\mu_i$ as a function of $G_i$, a correction to the end of the curve is carried out, by replacing the values of $\mu_i$ corresponding to the values of slip that result in the variation in the slip with respect to time being beyond the predetermined variation threshold, by corrected values as follows:

$$\mu_i^{Corr} = \mu_i \cdot \left[ \text{Max}\left(\frac{dG}{dt}; 1\right) \right]^{-ACorr}$$

where "Acorr" is a preset parameter.

31. The tire testing system according to claim 30, in which "Acorr" is equal to approximately 0.2.

32. The tire testing system according to claim 30, in which "Acorr" is used as a fine-tuning parameter.

* * * * *

UNITED STATES PATENT AND TRADEMARK OFFICE
CERTIFICATE OF CORRECTION

| | | |
|---|---|---|
| PATENT NO. | : 7,197,380 B2 | Page 1 of 1 |
| APPLICATION NO. | : 11/039108 | |
| DATED | : March 27, 2007 | |
| INVENTOR(S) | : Nicolas Fangeat et al. | |

It is certified that error appears in the above-identified patent and that said Letters Patent is hereby corrected as shown below:

<u>COLUMN 8</u>:

Line 22, "oncerns" should read --concerns--.

Signed and Sealed this

Tenth Day of July, 2007

JON W. DUDAS
*Director of the United States Patent and Trademark Office*